United States Patent
Honorato Ruiz et al.

(10) Patent No.: US 9,701,393 B2
(45) Date of Patent: Jul. 11, 2017

(54) HIGHLY INTEGRATED INNER STRUCTURE OF A TORSION BOX OF AN AIRCRAFT LIFTING SURFACE

(71) Applicant: AIRBUS OPERATIONS S.L., Getafe (Madrid) (ES)

(72) Inventors: Francisco Javier Honorato Ruiz, Getafe (ES); Francisco José Cruz Dominguez, Getafe (ES)

(73) Assignee: Airbus Operations S.L., Madrid (ES)

( * ) Notice: Subject to any disclaimer, the term of this patent is extended or adjusted under 35 U.S.C. 154(b) by 614 days.

(21) Appl. No.: 13/964,400

(22) Filed: Aug. 12, 2013

(65) Prior Publication Data

US 2014/0048652 A1 Feb. 20, 2014

(30) Foreign Application Priority Data

Aug. 16, 2012 (EP) .................................. 12382327

(51) Int. Cl.
| | | |
|---|---|---|
| *B64C 3/28* | (2006.01) | |
| *B29C 70/42* | (2006.01) | |
| *B64C 3/18* | (2006.01) | |
| *B64C 3/20* | (2006.01) | |
| *B29C 65/00* | (2006.01) | |
| *B29C 65/02* | (2006.01) | |

(Continued)

(52) U.S. Cl.
CPC ............... *B64C 3/28* (2013.01); *B29C 70/42* (2013.01); *B64C 3/18* (2013.01); *B64C 3/20* (2013.01); *B29C 35/0227* (2013.01); *B29C 65/02* (2013.01); *B29C 66/721* (2013.01); *B29C 66/7212* (2013.01); *B29C 66/72141* (2013.01); *B29C 66/73752* (2013.01); *B29L 2031/3085* (2013.01); *Y02T 50/433* (2013.01)

(58) Field of Classification Search
CPC .... B64C 3/28; B64C 3/20; B64C 3/18; B29C 70/42; B29C 35/0227; B29C 66/72141; B29C 66/73752; B29C 66/7212; B29C 65/02; B29C 66/721; Y02T 50/433; B29L 2031/3085

See application file for complete search history.

(56) References Cited

U.S. PATENT DOCUMENTS 5,829,716 A * 11/1998 Kirkwood ............... B64C 1/065
 244/117 R
7,387,277 B2 * 6/2008 Kordel ...................... B64C 3/00
 244/123.5

(Continued)

OTHER PUBLICATIONS

Extended European Search Report dated Jan. 31, 2013 in EP 12382327.0.

(Continued)

*Primary Examiner* — Valentina Xavier
(74) *Attorney, Agent, or Firm* — Nixon & Vanderhye P.C.

(57) ABSTRACT

A method for manufacturing a monolithic torsion box inner structure of an aircraft lifting surface including: a) providing a set of laminated preforms of a composite material for forming said torsion box inner structure, each laminated preform being configured for constituting a part of one component of the torsion box inner structure; b) arranging the laminated preforms in a curing tooling and subjecting the assembly to an autoclave cycle to co-cure the said laminated preforms; c) demoulding the curing tooling in a vertical direction.

8 Claims, 4 Drawing Sheets

(51) Int. Cl.
   *B29L 31/30*     (2006.01)
   *B29C 35/02*     (2006.01)

(56)       References Cited

U.S. PATENT DOCUMENTS

| | | | |
|---|---|---|---|
| 8,096,504 B2 * | 1/2012 | Arevalo Rodriguez | B29D 99/0014 244/119 |
| 8,182,640 B1 * | 5/2012 | Boone | B29C 65/48 156/285 |
| 8,585,856 B1 * | 11/2013 | Boone | B29C 70/44 156/156 |
| 9,050,757 B1 * | 6/2015 | Boone | B32B 37/10 |
| 2008/0265093 A1 | 10/2008 | Munoz Lopez et al. | |
| 2009/0072090 A1 * | 3/2009 | Kallinen | B64C 9/02 244/131 |
| 2013/0149164 A1 * | 6/2013 | Hansen | B64F 5/0009 416/226 |
| 2014/0166208 A1 * | 6/2014 | Schubiger | B29C 66/721 156/468 |

OTHER PUBLICATIONS

F.C. Campbell, "Integrally Cocured Structure" Jan. 2004, 5 pages.
G. Kress, "Design Criteria" ASM Handbook, Dec. 2001, pp. 353-359.

* cited by examiner

HIGHLY INTEGRATED INNER STRUCTURE OF A TORSION BOX OF AN AIRCRAFT LIFTING SURFACE

This application claims priority to EP 12382327.0 filed 16 Aug. 2012, the entire contents of which is hereby incorporated by reference.

FIELD OF THE INVENTION

The present invention refers to the torsion box of an aircraft lifting surface and more in particular to a torsion box of an aircraft lifting surface with a highly integrated inner structure.

BACKGROUND OF THE INVENTION

An aircraft lifting surface (see FIG. 1a) is usually structured by leading edges 11, torsion boxes 13, trailing edges 15 with control surfaces (flaps, elevators, rudders, etc.), a root joint 17 and tips 18.

A torsion box 13 is a primary structure responsible of supporting all loads involved (aerodynamic, fuel, dynamics, etc.) and comprises several structural elements. In the known configuration shown in FIG. 1b said structural elements are upper and lower skins 31, 33 stiffened by longitudinal stringers, a front spar 19, a rear spar 20 and transversal ribs 37 attached to the frontal and rear spars 19, 20 and to the upper and lower skins 31, 33 in order to keep the torsion box shape and reinforce the load introductions areas linked to the structural arrangement to the rest of the structure and to the actuators for handling the control surfaces.

The leading and trailing edge edges 11, 15 are structures responsible for keeping the overall aerodynamic shape of the aircraft lifting surface.

A known leading edge 11 (see FIG. 1c) comprises, on the one hand, several ribs 21, called leading edge ribs, attached to the front spar 19 of the torsion box 13 and, on the other hand, an aerodynamic profile 25 attached to the leading edge ribs 21 and to the flanges of the front spar 19.

Similarly the trailing edge 15 comprises trailing edge ribs attached to the rear spar 20 and an aerodynamic profile attached to the trailing edge ribs and to the flanges of the rear spar 20.

Nowadays, and particularly in the aeronautical industry, composite materials with an organic matrix and continuous fibers, especially CFRP (Carbon Fiber Reinforced Plastic) are widely used in a great variety of structural elements. Specifically, all the elements which make up the aforementioned torsion boxes 13 can be manufactured using CFRP.

Typically, all structural elements forming a torsion box (upper and lower skins 31, 33, front and rear spar 19, 20 and ribs 37) are manufactured separately and then joined by means of rivets with the aid of complicated tooling to achieve the necessary tolerances, which are given by the aerodynamic, assembly and structural requirements.

A well-known method for manufacturing said elements uses prepreg technology. In a first step, a flat lay-up of composite prepreg plies for each element is prepared. Then a laminated preform of the element with the required shape is obtained by means of a classical hot-forming process, being in some cases substituted by a press-forming process due to high curvatures. After getting the required shape, the laminated preform is cured in a male or female tooling depending on the tolerances required and the overall manufacturing cost. In the case of certain elements comprising sub-components cured separately, such as a rib 37 and a vertical stiffener of it, a second curing cycle is needed for co-bonding said sub-components. Finally, after all the curing cycles, the element contours are trimmed getting the final geometry, and then the element is inspected by an ultrasonic system to assure its quality.

The cost of the inner structure of a torsion box manufactured with said method is high because said steps shall be carried out independently for each element (spars 19, 20 and ribs 37).

Additionally, the cost related to the assembly of the torsion box is also high due to the long length and high complexity of the tasks required to install and to fit all inner elements like spars 19, 20 and ribs 37 together. First of all, the front and rear spars 19, 20 are located in the assembly jig, ensuring the interfaces with the leading and trailing edges 11, 15. Then, all the ribs 37 are located using the vertical stiffeners located on both spars 19, 20 as references and are joined to them by means of bolts. This rib assembly is as long as the number of ribs demands. After assembling the inner structure of the torsion box both upper and lower skins 31, 33 are located over the inner structure, joining them to spars 19, 20 and ribs 37 with rivets, in a final stage closing the whole torsion box.

After the assembly of the torsion box and prior to the installation of the leading and trailing edge aerodynamic profiles, the leading and trailing edge ribs are positioned and bolted to, respectively, the front and rear spars 19, 20 using outer stiffeners located on them as references. The assembly of these leading and trailing edge ribs involves additional costs to the ones related to the main torsion box assembly process.

SUMMARY OF THE INVENTION

It is an object of the present invention to provide a method for manufacturing a monolithic inner structure for torsion boxes of an aircraft lifting surface for reducing the number of different elements of a torsion box to be manufactured and installed.

It is another object of the present invention to provide a monolithic inner structure for torsion boxes of an aircraft lifting surface applicable both to classical architectures and to new architectures having an optimized structure for the loads involved.

In a first aspect, the above-mentioned objects are met by a method for manufacturing a torsion box inner structure of a lifting surface of a given configuration comprising the following steps: a) providing a set of laminated preforms of a composite material for forming said torsion box inner structure, each laminated preform being configured for constituting a part of one component of the torsion box inner structure; b) arranging said laminated preforms in a curing tooling and subjecting the assembly to an autoclave cycle to co-cure said laminated preforms; c) demoulding the curing tooling in a vertical direction.

In a second aspect, the above-mentioned objects are met by an aircraft lifting surface wherein the inner structure of each torsion box is a monolithic structure manufactured according to the above-mentioned method, the upper and lower skins are attached to the torsion box inner structure, and the leading and trailing edge aerodynamic profiles are attached to the torsion boxes. Said monolithic inner structure comprises a front spar, a rear spar, internal reinforcing elements with vertical stiffeners and external elements working as ribs for attaching said leading and trailing edge profiles.

In one embodiment, the front spar, the rear spar and the internal reinforcing elements are configured with upper and lower flanges/feet. The upper and lower skins are attached to the torsion box inner structure along said upper and lower flanges/feet by means of a bolted joint.

In another embodiment, the upper and lower skins are configured with caps in their internal faces as attaching members with the front spar, the rear spar and the internal reinforcing elements. The upper and lower skins are attached to the torsion box inner structure joining said caps with the webs of the front spar, the rear spar and the internal reinforcing elements.

The monolithic nature of a torsion box inner structure of an aircraft lifting surface due to the above-mentioned manufacturing method allows optimized torsion box architectures without the constraints involved in the torsion boxes manufactured by attaching a large number or components.

Other desirable features and advantages of the aircraft lifting surface according to this invention will become apparent from the subsequent detailed description of the invention and the appended claims, in relation with the enclosed drawings.

DETAILED DESCRIPTION OF THE INVENTION

Figure 1A:
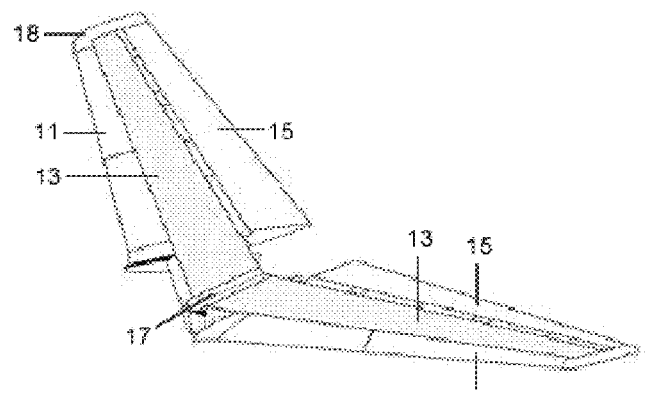
FIG. 1a is a perspective view of a known horizontal tail plane showing the torsion boxes, the leading edges and the trailing edges with control surfaces.
Figure 1B:
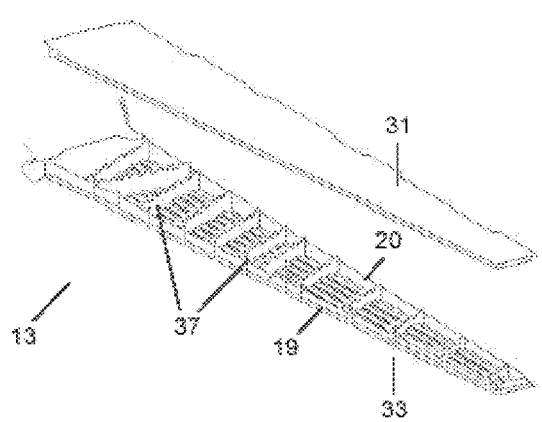
FIG. 1b is a perspective view of a known torsion box, where the upper skin has been moved upwards to improve the visibility inside the box.
Figure 1C:
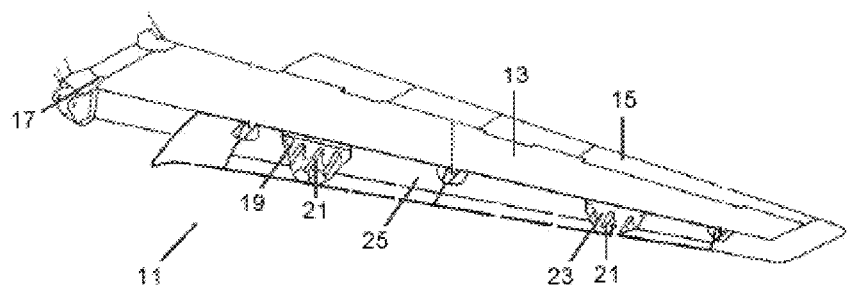
FIG. 1c is perspective view of one side of the horizontal tail plane of FIG. 1a with cutaways to improve the visibility of the leading edge structure showing the leading edge ribs and the leading edge profiles.
Figure 2A:
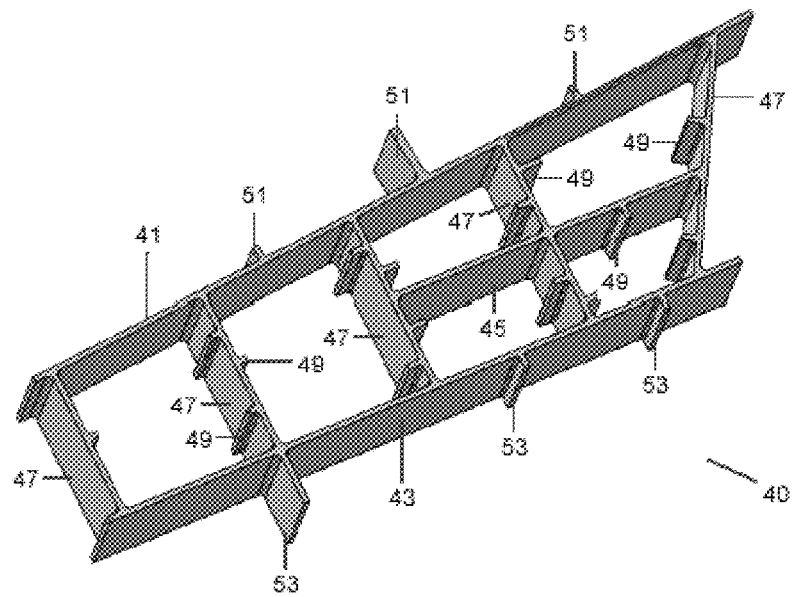
FIG. 2a is a schematic perspective view of a torsion box inner structure according to the present invention including a front spar, a rear spar, a middle spar extending along half of the torsion box, ribs and internal and external vertical stiffeners.

FIG. 2a shows a monolithic torsion box inner structure 40 according to the invention comprising:

A front spar 41 with external elements 51 for attaching the leading edge 11.

A rear spar 43 with external elements 53 for attaching the trailing edge.

An internal spar 45 with vertical stiffeners 49 to improve its structural behavior against buckling.

Transversal ribs 47 with vertical stiffeners 49 to improve its structural behavior against buckling.

This monolithic torsion box inner structure 40 does not comprise connecting elements with the upper and lower skins so that they will have to be included in the upper and lower skins as will be discussed later on. We will also describe another embodiment of the invention where the monolithic torsion box inner structure comprises connecting elements with the upper and lower skins.

The torsion box inner structure 40 of FIG. 2a can be manufactured by a method according to the invention based on prepreg technology that will now be described.

The basic steps of the method are the following:

Preparing a set of laminated preforms that will form the torsion box inner structure laying-up for each of them a flat lay-up of composite prepreg plies and subjecting the flat lay-up to a hot-forming process on a suitable tool to give it the desired shape. The term "laminated preform" as used in this specification designates a composite item that requires an individual process such as hot-forming, press-forming, etc. to form it with certain characteristics and that is intended to be integrated with other elements in the manufacturing process of the product to which it belongs. The laminated preforms can also be made directly with the final shape by means of an automatic fiber placement machine, locating the carbon fiber over the curing tooling which will be integrated with the whole set.

Arranging together all the laminated preforms on a suitable tooling and subjecting the assembly to an autoclave cycle to co-cure the laminated preforms.

Demoulding the tooling in a vertical direction.

Trimming and inspecting the assembly.

Figure 3A:
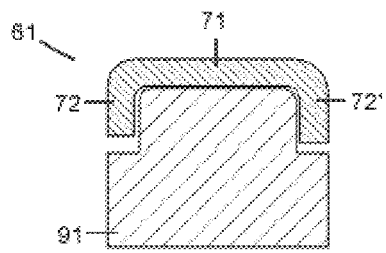
FIGS. 3a, 3b, 3c and 3d are schematic cross sections of the laminated preforms used to manufacture the torsion box inner structure of FIG. 2a in the forming tooling.

The laminated preforms used to manufacture the torsion box inner structure 40 of FIG. 2a are the following:

C-shaped laminated preforms 61 configured by a web 71 and two flanges 72, 72' which are formed (see FIG. 3a) by bending the ends of the initial flat lay-up on a tool 91 to get the flanges 72, 72'.

Figure 3B:
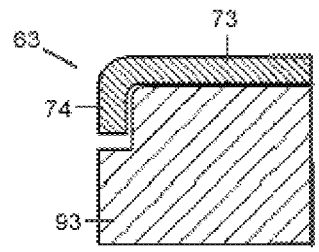

L-shaped laminated preforms 63 configured by a web 73 and a flange 74, which are formed (see FIG. 3b) by bending one end of the initial flat lay-up on a tool 93 to get the primary flange 74.

Figure 3C:
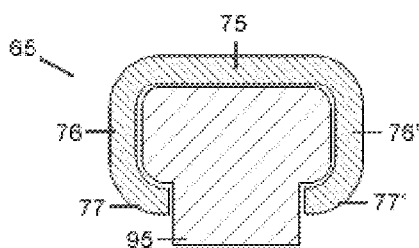

Double C-shaped laminated preforms 65 configured by a web 75, two primary flanges 76, 76' and two secondary flanges 77, 77' which are formed (see FIG. 3c) by bending the ends of the initial flat lay-up on a tool 95 in two steps to get the primary flanges 76, 76' and the secondary flanges 77, 77'.

Figure 3D:
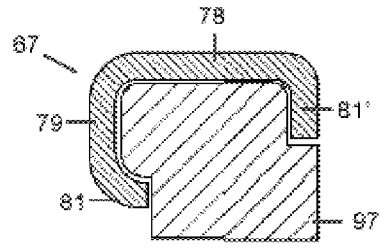

Double L-shaped laminated preforms 67 configured by a web 78, a primary flange 79 and two secondary flanges 81, 81' which are formed (see FIG. 3d) by bending the ends of the initial flat lay-up on a tool 97 in two steps to get the primary flange 79 and the secondary flanges 81, 81'.

Figure 2B:
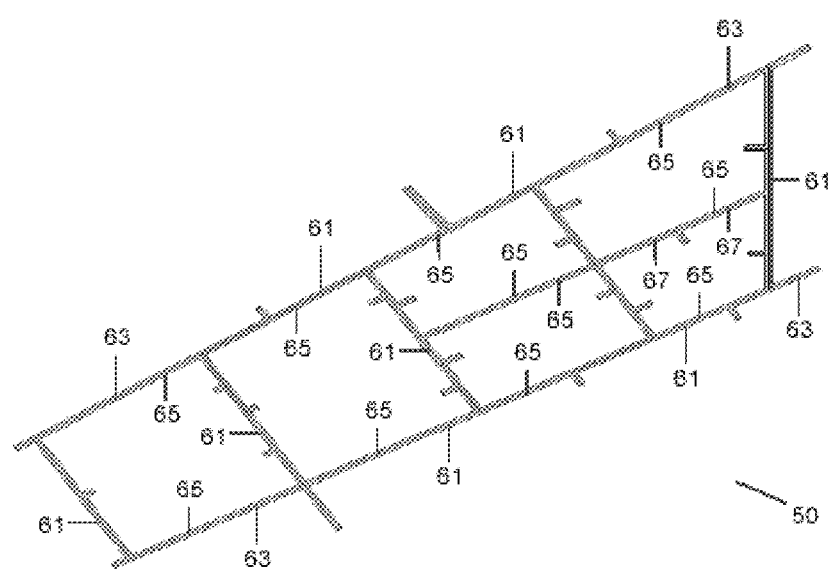
FIG. 2b is a schematic plan view of the laminated preforms used to manufacture the torsion box inner structure of FIG. 2a according to the present invention.

FIG. 2b shows the assembly 50 of the laminated preforms used to manufacture the torsion box inner structure 40 shown in FIG. 2a:

A set of C-shaped laminated preforms 61 and L-shaped laminated preforms 63 which are configured and arranged for constituting with their webs 71, 73 the external part of the front and rear spars 41, 43 and for constituting with their primary flanges 72, 72', 74 a part of the external elements 51, 53.

A set of double C-shaped laminated preforms 65 configured and arranged for constituting with their webs 75 the internal part of the front and rear spars 41, 43 and parts of the middle spar 45, for constituting with their primary flanges 76, 76' a part of the ribs 47, and for constituting with their secondary flanges 77, 77' a part of said vertical stiffeners 49.

A set of C-shaped laminated preforms 61 configured and arranged for constituting with their webs 71 a part of the ribs 47 and for constituting with their primary flanges 72, 72' a part of said vertical stiffeners 49 and an internal part of said front and rear spars 41, 43.

A set of double L-shaped laminated preforms 67 configured and arranged for constituting with their webs 78 a part of the middle spar 45, for constituting with their primary flange 79 a part of a rib 47 and for constituting with their secondary flanges 81, 81' a part of said vertical stiffeners 49.

In FIG. 2b the reference numbers of webs and flanges of each laminated preform (shown in FIGS. 3a-3d) are omitted for the sake of clarity.

The thickness and composite material of each preform are defined according to the structural needs of the members of the torsion box inner structure 40: front and rear spars 41, 43, ribs 47, internal spar 45, vertical stiffeners 49 and external elements 51, 53.

Figure 4:
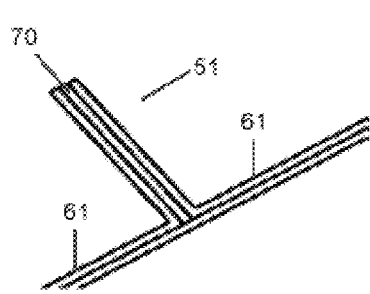
FIG. 4 is a schematic plan view of a vertical stiffener having an intermediate laminate as reinforcement.

In any case, if additional reinforcements are required in, for example, an external element 51 constituted with the primary flanges of two C-shaped laminated preforms 61 (see FIG. 4), a flat laminated preform 70 working as an additional reinforcement is arranged between said primary flanges.

After curing all these laminated preforms inside the autoclave, the curing tooling is demoulded in a vertical direction and the monolithic torsion box inner structure 40 is obtained.

After completing the demoulding process, the torsion box inner structure 40 is located in the trimming machine in order to get the final geometry, without requiring different individual trimming process and the handling operations associated. In the same way, the automatic ultrasonic inspection of the whole element is carried out without any individual operations.

Figure 5:
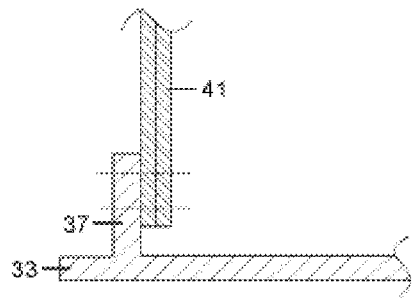
FIG. 5 is schematic cross section of a riveted joint between a spar web and a cap integrated in the lower skin of the torsion box.

The next step in the manufacturing process of a torsion box 13 according to this invention is attaching to the torsion box inner structure 40 the upper and lower skins 31 and 33 including caps 37 as connecting elements with the ribs 47, the internal spar 45 and the front and rear spars 41, 43. FIG. 5 shows a joint between the lower skin 33 and a front spar 41. The lower skin 33 includes a cap 37 which is riveted to the front spar 41. The cap 37 is located externally to the front spar 41, having as interface datum the outer surface of the spar web, in order to avoid any mousehole due to rib webs in the caps which could penalize cap strength.

In another embodiment of the invention, the monolithic torsion box inner structure according to the invention comprises connecting elements with the upper and lower skins 31, 33, such as flanges/feet of spars/ribs.

Figure 6:
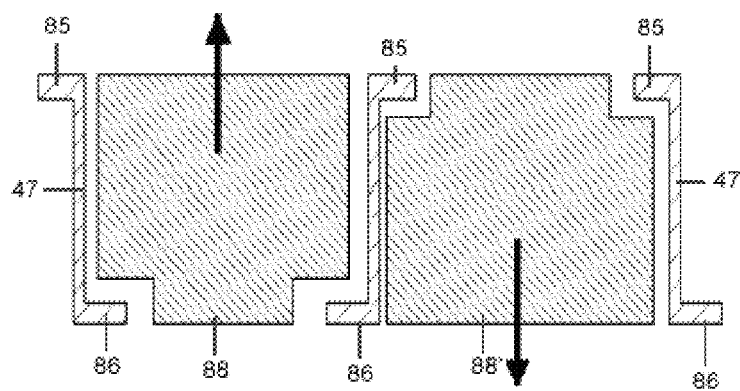
FIG. 6 is a partial schematic cross section of the assembly of the laminated preforms used to manufacture a torsion box inner structure according to the present invention showing flanges/feet in spars/ribs.

In that case, as shown in FIG. 6, the spars/ribs 47 will include flanges/feet 85, 86 with a different orientation in adjacent spar/ribs (and on opposite sides of the web of the same spar/rib) so that adjacent tools 88, 88' can be demoulded in the directions indicated by the arrows. If the flanges/flanges of adjacent spars/ribs would not have a different orientations, the tooling 88, 88' should be split in the pieces needed for making feasible the demoulding in vertical direction without any clash with spar flanges and rib feet.

Figure 7:
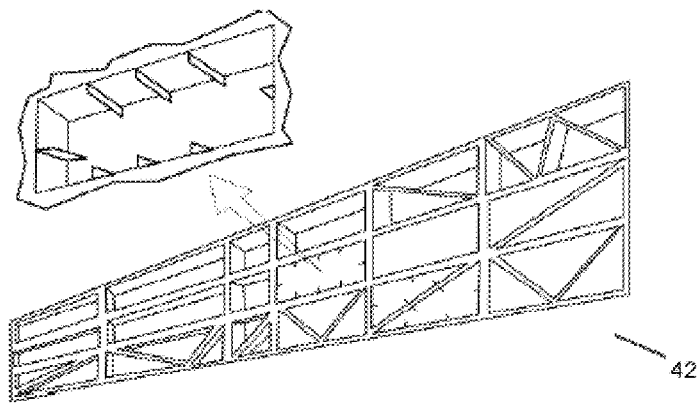
FIG. 7 is a schematic perspective view of a torsion box inner structure according to this invention having ribs which run diagonally.

FIG. 7 shows a torsion box inner structure 42 according to the invention including ribs which run diagonally with respect to the front and rear spars and internal spars not parallel to the outer spars. The structural behavior of these internal reinforcing elements of this torsion box inner structure 42 is improved as they are oriented towards the main load direction, consequently reducing, the number of elements required inside the torsion box and, at the same time, reducing the weight and cost of the overall lifting surface.

Figure 8:
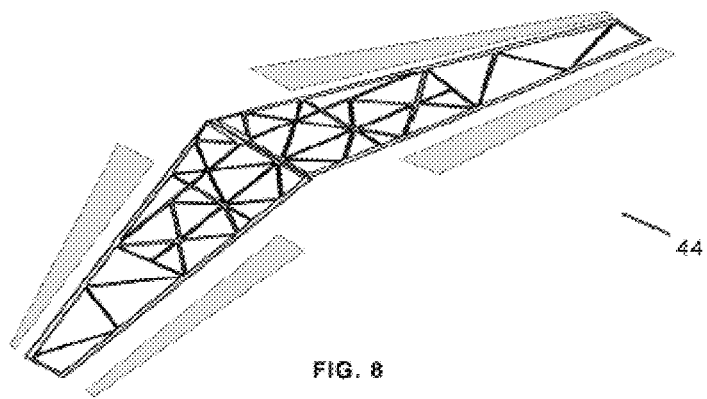
FIG. 8 is a schematic plan view of a torsion box inner structure according to this invention extended from one tip to the other of the lifting surface, including diagonal ribs and internal spars and the dihedral and swept angle changes due to aerodynamic requirements.

FIG. 8 shows a torsion box inner structure 44 according to the invention having both lateral inner structures integrated in a single inner structure, i.e. the whole inner structure extending from one end to the other end of the aircraft lifting surface is obtained from the autoclave. The torsion box inner structure 44 includes the aerodynamic requirements in terms of dihedral angle and swept angle changes from one side of the aircraft symmetry plane to the other and including the center rib itself. If any additional reinforcements will be needed in the center area, it will be possible to install them thanks to the accessibility available. The upper and lower skins (whether manufactured in a single part or divided in two parts) are attached to the torsion box inner structure 44 as explained above.

Although the present invention has been described in connection with various embodiments, it will be appreciated from the specification that various combinations of elements, variations or improvements therein may be made, and are within the scope of the invention.

The invention claimed is:

1. A method for manufacturing a torsion box inner structure of an aircraft lifting surface, wherein the torsion box inner structure includes at least the following components: a front spar, a rear spar, internal reinforcing elements with vertical stiffeners and external elements attachable to leading and trailing edges of the aircraft lifting surface, the method comprises:
    providing a set of laminated preforms made of a composite material for forming said torsion box inner structure, wherein each of the laminated preforms is configured to be a part of one of the components of the torsion box inner structure;
    arranging the laminated preforms in a curing tooling and subjecting the arranged laminated preforms to an autoclave cycle to co-cure said laminated preforms to form as a monolithic component the torsion box inner structure, wherein the laminated preforms are arranged vertically in the curing tooling; and
    demoulding the curing tooling in a vertical direction by providing relative movement in the vertical direction between the curing tooling and the monolithic component.

2. The method according to claim 1, wherein the laminated preforms comprise at least a C-shaped laminated preform including a web and two primary flanges and at least one of the following laminated preforms:
    an L-shaped laminated preform configured with a web and one primary flange;
    a double-C shaped laminated preform including a web, two primary flanges and two secondary flanges; and
    a double-L shaped laminated preform including a web, a primary flange and two secondary flanges.

3. The method according to claim 2, wherein the configuration of said laminated preforms further comprises connecting elements with the upper and lower skins of the torsion box.

4. The method according to claim 2, wherein the torsion box inner structure is formed with:
- a subset of C-shaped laminated preforms and L-shaped laminated preforms configured for constituting with their webs an external part of the front and rear spars and for constituting with their primary flanges said external elements;
- a subset of double C-shaped laminated preforms configured for constituting with their webs an internal part of the front and rear spars, for constituting with their primary flanges a part of the internal reinforcing elements, and for constituting with their secondary flanges a part of said vertical stiffeners;
- a subset of C-shaped laminated preforms configured for constituting with their webs a part of said internal reinforcing elements and for constituting with their primary flanges a part of said vertical stiffeners;
- a subset of double L-shaped laminated preforms configured for constituting with their webs and primary flanges a part of said internal reinforcing elements and for constituting with their secondary flanges a part of said vertical stiffeners.

5. A method to manufacture a torsion box for an aircraft lifting surface comprising:
- arranging the laminated composite material preforms in a curing tool, wherein each of the laminated composites is oriented vertically within the curing tool, wherein the preforms are arranged as an inner structure of the torsion box and the inner structure includes a front spar, a rear spar, an internal reinforcing element with a vertical stiffener, and an external element attachable to a leading or trailing edge of the aircraft lifting surface;
- curing in an autoclave cycle the laminated composite material preforms in the curing tool components to form a monolithic inner structure of the torsion box, wherein the monolithic inner structure includes the front spar, rear spar, the internal reinforcing element with the vertical stiffener and the external element attachable to the leading or the trailing edge of the aircraft lifting surface, and
- demoulding the curing tooling by separating the curing tool from the monolithic inner structure, wherein the separation is performed by relative movement along a vertical direction of the curing tool and the monolithic inner structure.

6. The method of claim 5 wherein the laminated preforms each have an L or a C shaped cross section, wherein the cross section is along a horizontal plane.

7. The method of claim 5 wherein the laminated composite material preforms each have an upper edge and a lower edge, and planar surfaces extending entirely between the upper edge and the lower edge and extending entirely to at least one of the upper edge and the lower edge, and the step of arranging the laminated composite material preforms in a curing tool includes orienting the planar surfaces vertically.

8. The method of claim 7 further comprising a flange extending in a first horizontal direction on one but not both of the upper edge and the lower edge of at least one of the laminated composite material preforms.

* * * * *